(No Model.)
T. E. KIRKBRIDE & C. E. OURAM.
FRICTION CLUTCH PULLEY.
No. 521,240.　　　　　　　　Patented June 12, 1894.
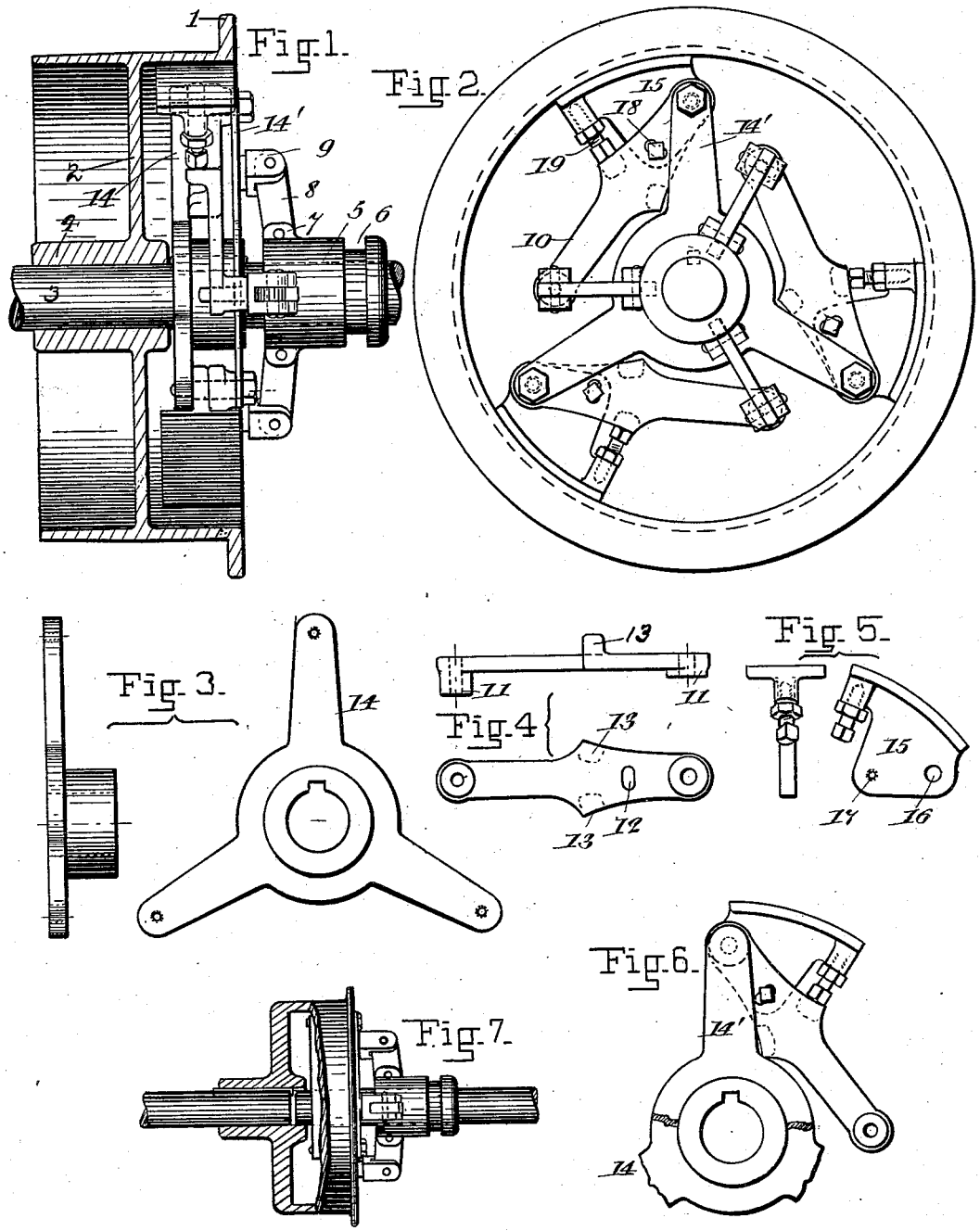

UNITED STATES PATENT OFFICE.

THOMAS E. KIRKBRIDE AND CHARLES E. OURAM, OF PHILADELPHIA, PENNSYLVANIA.

FRICTION-CLUTCH PULLEY.

SPECIFICATION forming part of Letters Patent No. 521,240, dated June 12, 1894.

Application filed February 26, 1894. Serial No. 501,620. (No model.)

*To all whom it may concern:*

Be it known that we, THOMAS E. KIRKBRIDE and CHARLES E. OURAM, both of the city of Philadelphia, county of Philadelphia, State of Pennsylvania, have invented certain new and useful Improvements in Friction-Clutch Pulleys, of which the following is a specification.

The object of our invention is to produce a friction clutch coupling to be used with a pulley in which it shall not be necessary to use any screw or spring as an actuating mechanism, which is reversible so as to run either to right or left, and which can be readily and cheaply manufactured and is durable.

With these objects in view our invention consists in the pulley friction clutch hereinafter described and claimed.

Referring to the accompanying drawings which form a part of this specification, Figure 1 is a side view of the pulley and friction clutch the pulley wheel being shown in cross section and the other parts in elevation. Fig. 2 is a front view of the same. Fig. 3 shows the spider both in front and edge views. Fig. 4 is a detail of one of the lever arms shown in front and edge views. Fig. 5 is a detail of one of the friction shoes shown in side and end views. Fig. 6 is a detail showing the position of the expansion lever, friction shoe, and spider, when the clutch is reversed from the position of Fig. 2. Fig. 7 is a side view partly in section showing a modification, to wit: a friction clutch coupling.

The pulley wheel, hub and connecting web are cast in one piece. Around the outer rim of the pulley wheel is a flange 1 projecting outward therefrom. This pulley wheel is connected with its hub by a web 2, or by arms. The part of the pulley wheel against which the friction clutch presses should be cast somewhat thicker than the part on the other side of the web so that its clutch face may be turned true. The flange strengthens this side of the pulley wheel. On the shaft 3 is slipped the hub 4 of the pulley and also the friction clutch. The pulley is loose on the shaft. This friction clutch consists of a sleeve 5 near the end of which is cut a groove 6 to provide for throwing the sleeve in and out. To the open forks 7, on this sleeve are pinned links 8 which connect the sleeve 5 to the expansion levers, being connected to the latter by swivel joints 9. These expansion levers which are shown in detail in Fig. 4 are flat bars which have, at either end, bolt holes surrounded by hubs 11 having flattened and rounded tops. These hubs stand out from one side of the expansion levers at right angles to the same. The expansion levers are also perforated with slots 12 and have, on the other sides from the hubs 11, two lugs 13. Only one of these lugs is in use at one time, but the two are provided to make the clutch reversible as will hereinafter appear.

On the shaft between the pulley hub 4 and the sleeve 5 is a spider 14 which has three arms. This spider, which is shown in detail in Fig. 3 has a hub by which it is keyed to the shaft. The three arms of the spider project out radially, at equal angular distances from each other, from the hub of the spider. A three armed brace 14', having arms similar to those of the spider 14, is fitted on to the hub of the spider. Its arms support the outer ends of the bolts inserted therein. To each arm of the spider is pinned one end of one of the expansion levers and also one of the friction shoes 15, in manner shown clearly in Fig. 2, the expansion lever and shoe lying between the arms of the brace and spider with the hubs on the expansion levers lying next to the arms of the brace, and the web of the shoe in contact with the spider arms.

The shoe illustrated in detail in Fig. 5, has a web projecting from the inner side dividing it throughout its length along its middle line so that the shoe is symmetrical with respect to the web and is therefore reversible. Through this web is a drilled hole 16 for the pin by which it is attached to the spider arm and a tapped hole 17 in which is inserted a cap screw 18 that is passed through the slot 12 in the expansion lever. The head of this cap screw is on the other side of the expansion lever from the web and holds the expansion lever against the side of the web with sufficient firmness to pull the shoe from its friction contact when the expansion levers are drawn out. At the toe of the shoe is a set screw 19 which bears against one of the lugs 13 on the expansion lever, and may be adjusted to effect any desired pressure of the clutch. It will be seen that by locating the screw at the toe of the shoe we get adjustment at the point where it is most effective. And as the adjusting screw lies in the plane of the web the reversibility of the shoe is not impaired.

The operation of this clutch is readily understood from the foregoing description. When the sleeve is pushed toward the pulley hub the free ends of the expansion arms are pushed out and the screws 19 on the shoes are engaged by the lugs 13 on the expansion arms whereby the toes of the shoes are pressed against the inside face of the pulley wheel thereby clutching it.

The method of reversing the clutch is to take the mechanism apart and reassemble it as shown in Fig. 6. The shoes are reversed from side to side. This brings the other side of the web in contact with the expansion lever which can be done since both sides of the web are flat and the friction face of the shoe is symmetrical with respect to the web.

In Fig. 7 the shaft is shown as divided, at the point that lies just within the hub of the pulley.

What we claim, and desire to secure by Letters Patent, is—

1. In a friction clutch the combination with a pulley of a spider and sleeve having concentric hubs, expansion levers one end of each of which is attached directly to the end of one of the arms of the spider, a plurality of links, each of which is attached to the opposite end of one of the said expansion levers and to the said sleeve, and friction shoes directly pivoted at their heels to the arms of the spider and engaging at their toes with the expansion levers, and means for adjusting the pressure of the shoes located at this point of engagement with the expansion levers, substantially as described.

2. In a friction clutch the combination with a pulley of a three armed spider and a sleeve, the spider and sleeve having concentric hubs, three expansion levers one end of each of which is attached directly to the end of one of the arms of the spider, a plurality of links, each of which is attached to the opposite end of one of the said expansion levers and to the said sleeve, the connection between the expansion lever and the link being a swivel joint, three friction shoes one of which is directly pivoted at its heel to each of the arms of the spider and engages at its toe with that one of the expansion levers which is attached to the same arm of the spider, and means for adjusting the pressure of the shoes located at this point of engagement with the expansion levers, substantially as described.

3. In a friction clutch, the combination with a pulley of a sleeve and spider having concentric hubs, expansion levers one end of each of which is attached directly to the end of one of the arms of the spider a plurality of links, each of which is attached to the opposite end of one of the said expansion levers and to the said sleeve, and friction shoes also attached to the arms of the spider and engaging with the expansion levers the mechanism being reversible so as to be adaptable for rotation in either direction, substantially as described.

4. In a friction clutch, the combination with a pulley of a sleeve and spider having concentric hubs, expansion levers one end of each of which is attached directly to the end of one of the arms of the spider a plurality of links, each of which is attached to the opposite end of one of the said expansion levers and to the said sleeve, and friction shoes directly pivoted to the arms of the spider at the heels of the shoes, engaging at their toes with the expansion levers, and means for adjusting the pressure of the shoes located at this point of engagement with the expansion levers, the mechanism being reversible so as to be adaptable for rotation in either direction, substantially as described.

5. In a friction clutch, the combination, with a pulley and with a sleeve and spider, all of which are mounted on aligned centers, of expansion levers, one end of each of which is pivoted to one of the arms of the said spider, links, each of which has its opposite ends attached to the other end of one of the said expansion levers and to the said sleeve, friction shoes, each of which has its heel directly pivoted to one of the arms of the spider, and a bolt connecting each of the said shoes with one of the expansion levers, whereby the latter may be drawn in, substantially as described.

6. In a frictional clutch, the combination, with a pulley and with a sleeve and spider, all of which are mounted on aligned centers, of expansion levers, one end of each of which is pivoted to one of the arms of the said spider, links, each of which has its opposite ends attached to the other end of one of the said expansion levers and to the said sleeve, friction shoes, each of which has its heel directly pivoted to one of the arms of the spider, and mechanism for adjusting the pressure of the shoes, located between the toe of each shoe and one of the expansion levers, substantially as described.

7. In a frictional clutch, the combination, with a pulley, and with a sleeve and spider, all of which are mounted on aligned centers, of expansion levers, each of which has oppositely located bearing points, and is pivoted at one end to the end of one of the arms of the spider, links, each of which is attached to the opposite end of one of the expansion levers, and to the sleeve, friction shoes, each of which is directly pivoted to one arm of the spider, and mechanism for adjusting the pressure of the shoes secured to the toe of each friction shoe and bearing on one of the said bearing points of the corresponding expansion lever whereby the parts may be reversed for rotation in either direction, substantially as described.

8. In a friction clutch, the combination, with a pulley and with a sleeve and spider, all of which are mounted on aligned centers, of expansion levers, each of which has oppositely located bearing lugs thereon, and is directly pivoted at one end to one of the arms of the spider, links, each of which is attached to the opposite end of one of the expansion levers and to the sleeve, friction shoes, each of which is directly pivoted to one of the arms of the spider, and mechanism for adjusting the pressure of the shoes, located at the toe of each shoe and in the plane of the web thereof and bearing thereon and on one of the lugs of the corresponding expansion lever, whereby the parts may be reversed for rotation in either direction, substantially as described.

Signed by us this 14th day of August, 1893.

THOMAS E. KIRKBRIDE.
CHAS. E. OURAM.

Witnesses:
F. A. PARKER,
EDWARD H. SKILL.